E. H. CROFOOT.
AUTOMOBILE WHEEL HOLDER.
APPLICATION FILED SEPT. 17, 1914.
1,131,477.
Patented Mar. 9, 1915.
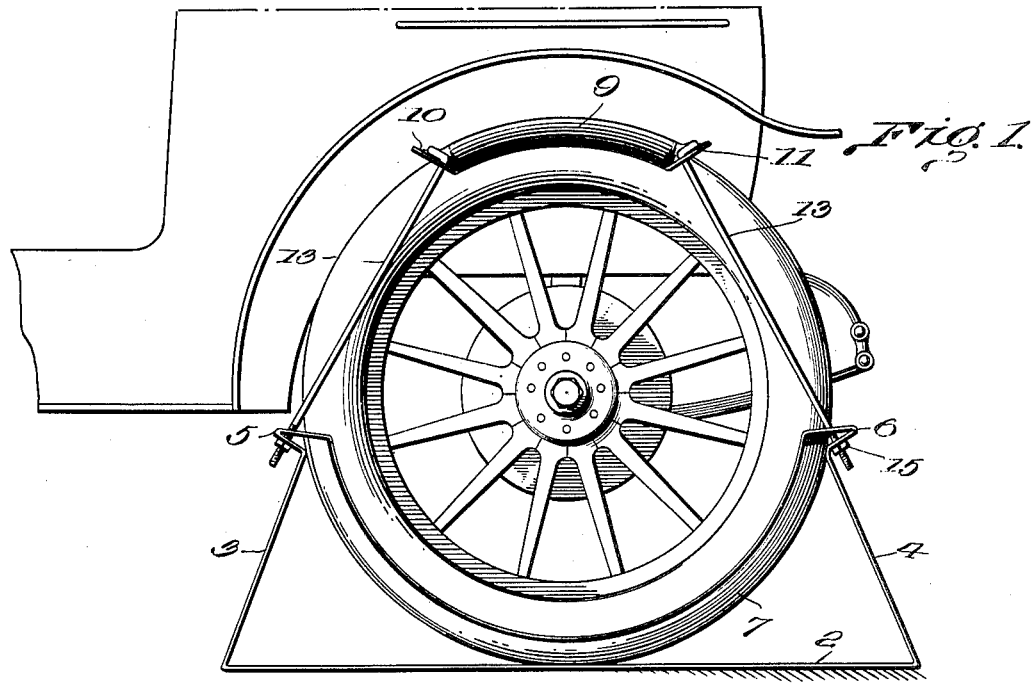
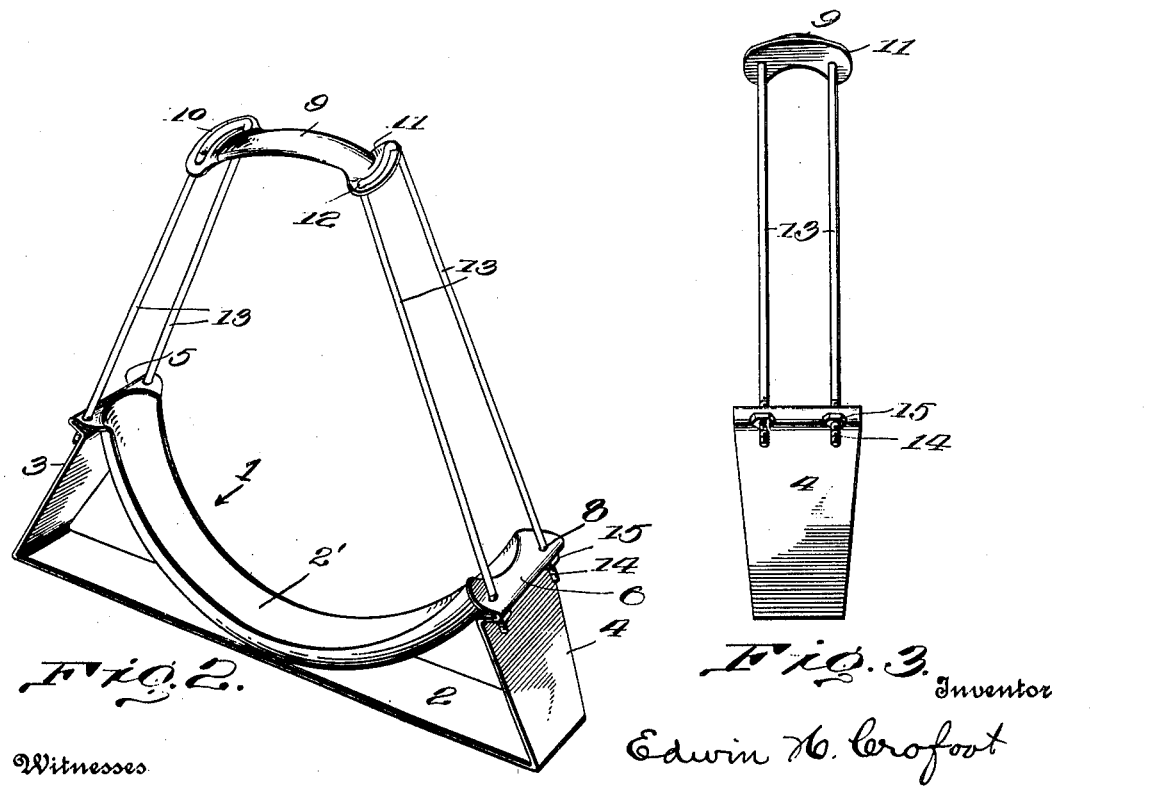
Inventor
Edwin H. Crofoot
By A. S. Pattison
Attorney

UNITED STATES PATENT OFFICE.

EDWIN H. CROFOOT, OF FINDLAY, OHIO, ASSIGNOR OF ONE-THIRD TO CYRUS L. CASTERLINE AND ONE-THIRD TO JOHN E. FENNERTY, BOTH OF FINDLAY, OHIO.

AUTOMOBILE WHEEL-HOLDER.

1,131,477.

Specification of Letters Patent.

Patented Mar. 9, 1915.

Application filed September 17, 1914. Serial No. 862,229.

*To all whom it may concern:*

Be it known that I, EDWIN H. CROFOOT, a citizen of the United States, residing at Findlay, in the county of Hancock and State of Ohio, have invented certain new and useful Improvements in Automobile Wheel-Holders, of which the following is a specification, reference being had therein to the accompanying drawing.

My invention relates to improvements in automobile wheel holders.

The object of my invention is to provide a wheel holder for automobiles to be used in shipping automobiles whereby the automobile is held in a rigid position in the car or boat as the case may be.

Another object of my invention is to provide a simple, cheap and effective wheel holder of this character having certain details of structure and operation hereinafter more fully described.

In the accompanying drawings:—Figure 1 is a side elevation of my improved holder applied to the rear wheel of an automobile. Fig. 2 is a perspective view of the holder before applied to the wheel. Fig. 3 is an end view of Fig. 2.

In the shipment of automobiles by train or boat, it has been found essential to provide some means whereby the automobile is rigidly held against movement in any direction and my invention consists in providing a holder which is very cheap to construct which will meet with all the necessary requirements of such a holder.

Referring now to the drawings, 1 represents the main body portion of my improved holder which is preferably made of metal and consists of the elongated based portion 2 having its ends turned upwardly into the inclined portions 3 and 4. The upper ends of these inclined portions 3 and 4 are formed with loops 5 and 6 which terminate in the curved tire receiving portion 7. This portion 7 is curved longitudinally and transversely for the purpose of receiving the tire and preventing it from being displaced therefrom. The looped portions 5 and 6 are provided with openings 8 through which the securing rods pass as will be hereinafter described.

It will be understood that the body portion being of thin metal, it is very light and requires very little metal in the manufacture of the same. There is little or no weight upon the curved portion 7 except at the point of the tread of the tire which is at a point 2' of the holder and the remainder of a holder simply forms means for clamping the holder to the tire and not for supporting the wheel. The upper clamping member 9 is curved longitudinally and transversely to fit the upper face of the tire and provided with the outwardly extending winged portions 10 and 11 provided with openings 12.

The securing rods 13 are formed preferably of a U-shaped form passing through the openings 12 in the winged portions 10 and 11 and having their lower ends screwthreaded at 14 and passing through the openings 8 in the looped portions 5 and 6 of the support. The winged portions 10 and 11 and likewise the looped portions 5 and 6 are of a width greater than that of the tire so that the securing rods 13 pass on the outside of the tire as fully shown in Fig. 1 of the drawings.

Nuts 15 are screwed upon the screwthreaded portion 14 upon the rods 13 below the looped portions 5 and 6 whereby the clamping member 9 is drawn downwardly upon the upper face of the tire and the whole device rigidly and securely fastened to the tire as fully shown in Fig. 1 of the drawings.

While I have shown this specific manner of making the wheel support, it will be understood that the same could be varied without departing from my invention.

Having thus fully described my invention what I claim and desire to secure by Letters Patent is:

1. A device of the character described comprising a base having a curved wheel supporting portion, a clamping member fitting the upper edge of the tire, and bolts secured to the base and the clamping member on the outside of the side of the tire whereby the wheel is clamped between the clamping member and the base.

2. A holder of the character described comprising an enlarged base having a curved wheel receiving portion and having at its upper end outwardly extending portions, a curved clamping member having outwardly extending portions, and adjustable bolts connecting the outwardly extending portion of the clamping member and base, substantially as shown and described.

3. A holder of the character described comprising an elongated base having a longitudinal and transversely curved tire receiving portion, a curved clamping member, and bolts connecting the clamping member and the base on the outside of the curved portions substantially as shown and described.

4. A holder of the character described comprising a base formed of metal and having a longitudinal and transversely curved portion to receive a portion of the tire of the vehicle, a clamping member having a longitudinal and transversely curved portion to fit the upper face of the tire, and bolts connecting the clamping member and the base on the outside of a line with the curved portion of the base and clamping member, substantially as shown and described.

5. A holder of the character described comprising a base formed of metal and having a longitudinal and transversely curved portion to receive a portion of the tire of the vehicle, said base having outwardly extending looped portions at the ends of the curved tire receiving portion, a clamping member having a longitudinally and transversely curved tire receiving portion, and outwardly extending flanges at its ends, U-shaped clamping bolts passing through the outwardly extending flanges of the clamping member and passing through the base, and means for adjustably securing the bolts to the said base.

6. A holder of the character described comprising a base formed of metal and having a horizontal flat portion terminating in inwardly and upwardly inclined ends having their upper ends looped and formed into a longitudinal and transversely curved tire receiving portion, of a width less than that of the looped portion, a clamping member having a longitudinally and transversely curved tire receiving portion, outwardly extending flanges carried by the ends of the clamping member, U-shaped bolts passing through the outwardly extending flanges and through openings in the looped portions of the base, and nuts on the free ends of the bolts below the looped portion.

7. A holder of the character described comprising a base having a longitudinal and transversely curved portion to receive a portion of the tire of the vehicle, said base having outwardly extending portions at the ends of the tire receiving portion, a clamping member having a longitudinally and transversely curved tire receiving portion, and outwardly extending flanges at its end, and bolts passing through the outwardly extending flanges of the clamping member and passing through the base, and means for adjustably securing the bolts to the said base.

8. A holder of the character described comprising a base having a longitudinally and transversely curved portion to receive a portion of the tire of the vehicle, said base having outwardly extending looped portions at the ends of the curved tire receiving portion, a clamping member having a longitudinally and transversely curved tire receiving portion, outwardly extending flanges at the ends of the tire receiving portion, and bolts passing through the outwardly extending flanges of the clamping member and passing through the base, and means for adjustably securing the bolts to the said base.

In testimony whereof I hereunto affix my signature in the presence of two witnesses.

EDWIN H. CROFOOT.

Witnesses:
S. W. MASCH,
W. L. STEARS.